United States Patent
Vyas et al.

(10) Patent No.: US 9,917,839 B2
(45) Date of Patent: Mar. 13, 2018

(54) COMMUNICATION MODEL BASED ON USER ROLE

(71) Applicant: Aruba Networks Inc., Sunnyvale, CA (US)

(72) Inventors: Ashish Vyas, Bangalore (IN); Edward Vajravelu, Bangalore (IN); Gopal Agarwal, Bangalore (IN); Venkatesh Joshi, Bangalore (IN)

(73) Assignee: ARUBA NETWORKS, INC., Sunnyvale, CA (US)

( * ) Notice: Subject to any disclaimer, the term of this patent is extended or adjusted under 35 U.S.C. 154(b) by 386 days.

(21) Appl. No.: 14/517,123

(22) Filed: Oct. 17, 2014

(65) Prior Publication Data

US 2016/0112427 A1   Apr. 21, 2016

(51) Int. Cl.
*H04L 29/06* (2006.01)

(52) U.S. Cl.
CPC ........ *H04L 63/101* (2013.01); *H04L 63/0227* (2013.01); *H04L 63/102* (2013.01); *H04L 63/105* (2013.01)

(58) Field of Classification Search
None
See application file for complete search history.

(56) References Cited

U.S. PATENT DOCUMENTS

| | | | | |
|---|---|---|---|---|
| 9,363,090 B1 * | 6/2016 | Paczkowski | ............ | H04L 63/10 |
| 2004/0010619 A1 * | 1/2004 | Thomas | ............ | H04L 29/12009 709/245 |
| 2005/0055573 A1 * | 3/2005 | Smith | ................. | G06F 21/6218 726/4 |
| 2006/0149965 A1 * | 7/2006 | Sharma | ................... | H04L 12/18 713/163 |
| 2006/0256959 A1 * | 11/2006 | Hymes | .................... | H04M 1/26 379/433.04 |
| 2007/0239987 A1 * | 10/2007 | Hoole | ................... | H04L 63/102 713/169 |
| 2010/0161728 A1 * | 6/2010 | Drozt | .................... | G06Q 10/10 709/204 |
| 2014/0108132 A1 * | 4/2014 | De Gour | ............ | G06Q 30/0246 705/14.45 |

* cited by examiner

*Primary Examiner* — Amir Mehrmanesh
(74) *Attorney, Agent, or Firm* — Hewlett Packard Enterprise Patent Department (57) ABSTRACT

A non-transitory computer readable medium includes instructions which, when executed by one or more hardware processors, causes performance of operations. The operations include receiving, by a network device from a first user device, a first message addressed to a second user device and identifying a first user role associated with the first user device and a second user role associated with the second user device. The operations further include determining whether a set of predefined user role relationships authorizes a communication between user devices having the first user role and user devices having the second user role. In response to determining that the set of predefined user role relationships do not authorize the communication between user devices having the first user role and user devices having the second user role, the operations refrain forwarding the first message from the first user device to the second user device.

15 Claims, 4 Drawing Sheets

COMMUNICATION MODEL BASED ON USER ROLE

BACKGROUND

Computer networks allow different computing systems that are remote from each other to communicate. Specifically, messages are passed between the different computing systems through the computer network. In some cases, a system administrator would like to prevent one computing device from sending or receiving messages from other computing devices. In order to block such messages, the system administrator may block messages based on the internet protocol (IP) address of the source of the message.

OVERVIEW

In general, in one aspect, embodiments relate to a non-transitory computer readable medium including instructions which, when executed by one or more hardware processors, causes performance of operations. The operations include receiving, by a network device from a first user device, a first message addressed to a second user device and identifying a first user role associated with the first user device and a second user role associated with the second user device. The operations further include determining whether a set of predefined user role relationships authorizes a communication between user devices having the first user role and user devices having the second user role. In response to determining that the set of predefined user role relationships do not authorize the communication between user devices having the first user role and user devices having the second user role, the operations refrain forwarding the first message from the first user device to the second user device.

In general, in one aspect, embodiments relate to a system that includes at least one network device including a hardware processor. The system is configured to perform operations that include receiving, by a network device from a first user device, a first message addressed to a second user device, identifying a first user role associated with the first user device and a second user role associated with the second user device, and determining whether a set of predefined user role relationships authorizes a communication between user devices having the first user role and user devices having the second user role. The operations further include responsive to determining that the set of predefined user role relationships do not authorize the communication between user devices having the first user role and user devices having the second user role, refraining from forwarding the first message from the first user device to the second user device.

Other aspects will be apparent from the following description and the appended claims.

DETAILED DESCRIPTION

Specific embodiments will now be described in detail with reference to the accompanying figures. Like elements in the various figures are denoted by like reference numerals for consistency. In the figures, three co-linear dots indicate that additional items of similar type to the preceding and succeeding items with respect to the dots may optionally exist.

In the following detailed description of embodiments, numerous specific details are set forth in order to provide a more thorough understanding. However, it will be apparent to one of ordinary skill in the art that one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, a user refers to a person, department, business entity, organization, or other group that is responsible for a device. For example, a user may own or lease a device. By way of some example users, a user may be an individual, a project development team, a family, a non-profit organization, or other type of user. Additionally, a user is deemed to perform an action when an individual, group, or hardware device performs an action on behalf of the user in one or more embodiments.

In general, embodiments provide a method, system, and computer readable medium for authorization of communication between user devices based on user roles. Specifically, each user device has a corresponding user and each user has a corresponding user roles. Administrators may set permissions for whether messages may be passed between user devices according to the user roles of the user having the device. Thus, upon a receipt of a message, one or more embodiments identify the user roles of users corresponding to the user devices and determine whether predefined user role relationships for the user roles authorize communication. If communication is authorized, then the message is forwarded. If communication is not authorized, then the message is not forwarded.

Figure 1:
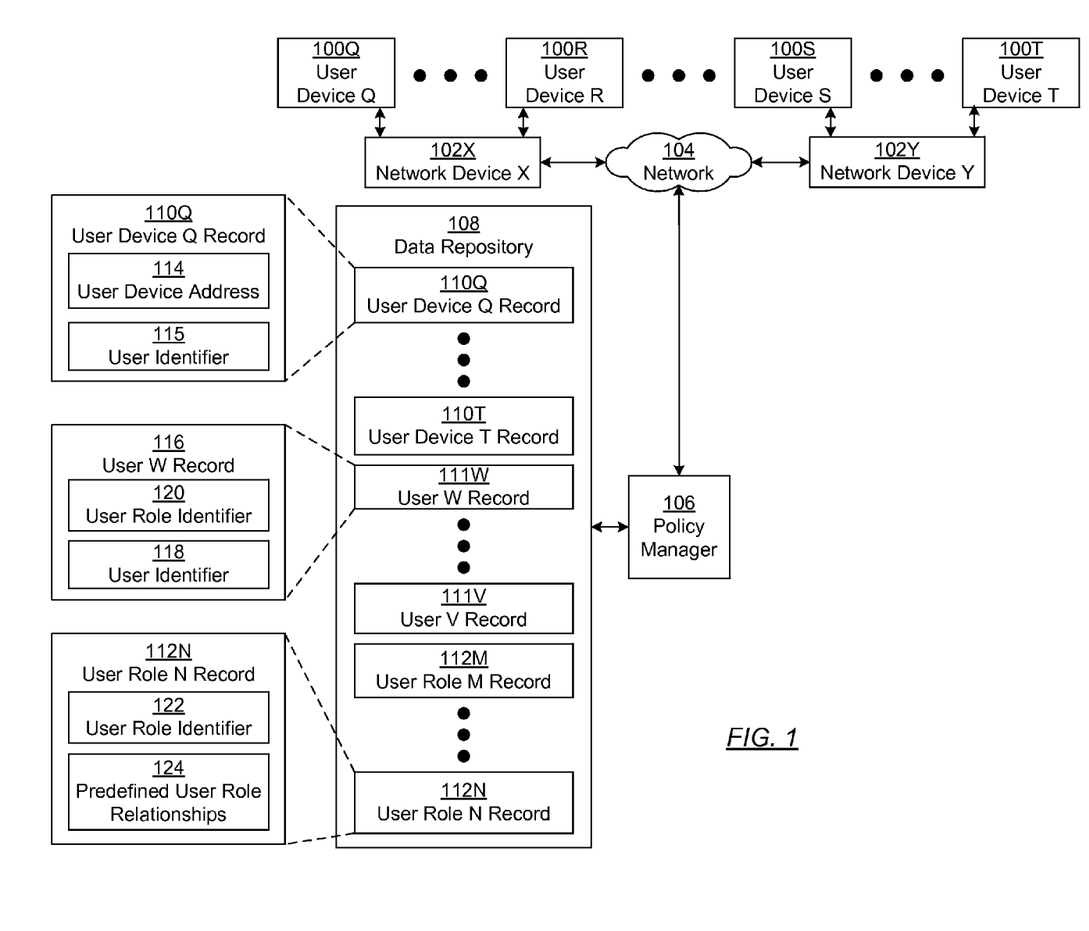
FIG. 1 shows a schematic diagram of a system in accordance with one or more embodiments.

FIG. 1 shows a schematic diagram of a system in accordance with one or more embodiments. As shown in FIG. 1, the system includes user devices (e.g., user device Q (100Q), user device R (100R), user device S (100S), user device T (100T)), network devices (e.g., network device X (102X), network device Y (102Y)), a network (104), a policy manager (106), and a data repository (108). Each of these components is discussed below in accordance with one or more embodiments.

In one or more embodiments, a user device (e.g., user device Q (100Q), user device R (100R), user device S (100S), user device T (100T)) is a hardware component that receives a communication from another user device of the system and/or transmits a communication to another user device of the system. The communication is transmitted or received in one or more messages. When the user device receives a communication, the user device may be referred to as a destination of the communication. When a user device transmits a communication, the user device may be referred to as a source of the communication. The communication may be, for example, a request or response for one or more services from another user device.

In one or more embodiments, a user device (e.g., user device Q (100Q), user device R (100R), user device S (100S), user device T (100T)) may be one or more mobile user devices (e.g., laptop computer, smart phone, personal digital assistant, tablet computer, or other mobile user device), gaming console, desktop computers, servers, blades in a server chassis, or any other type of electronic user device or user devices that includes at least the minimum processing power, memory, and input and output device(s) to perform one or more embodiments. For example, the user device may include one or more hardware processor(s), associated memory (e.g., random access memory (RAM), cache memory, flash memory, etc.), one or more storage user device(s) (e.g., a hard disk, an optical drive such as a compact disk (CD) drive or digital versatile disk (DVD) drive, a flash memory stick, etc.), and numerous other elements and functionalities. The hardware processor(s) may be an integrated circuit for processing instructions. For example, the hardware processor(s) may be one or more cores, or micro-cores of a processor. The user device may also include one or more input device(s), such as a touchscreen, keyboard, mouse, microphone, touchpad, electronic pen, or any other type of input device. Further, the user device may include one or more output device(s), such as a screen (e.g., a liquid crystal display (LCD), a plasma display, touchscreen, cathode ray tube (CRT) monitor, projector, or other display user device), a printer, external storage, or any other output device. One or more of the output device(s) may be the same or different from the input device(s). The input and output device(s) may be locally or remotely (e.g., via the network) connected to the hardware processor(s), memory, and storage user device(s). Many different types of user devices exist, and the aforementioned input and output device(s) may take other forms.

The user device may be connected to a network (104) via a network interface connection (not shown) and a network device (e.g., network device X (102X), network device Y (102Y)). The network (104) may be a local area network (LAN), a wide area network (WAN) such as the Internet, mobile network, or any other type of network, or a combination of networks. Further, the various user devices may be in the same Internet Protocol (IP) subnet or different IP subnets. For example, two or more of the user devices may be in the same virtual local area network (VLAN).

A network device (e.g., network device X (102X), network device Y (102Y)) is a digital hardware user device that may be communicatively coupled to the network (104). By way of an example, a user device may be directly wired or wirelessly communicatively connected to a single access point, which is directly communicatively connected to a single controller, which is connected to the network (e.g., network (104)). In the example, the network device may be the access point, the controller, an access point that includes the functionality of a controller, a switch (e.g., mobility access switch), or other such user device. Additionally, by way of an example, one network device may be a controller while another network device may be an access point. The network device that is the access point in the example may or may not be connected to the network via the network device that is a controller.

An access point is a separate hardware unit from a user device that is directly, wired or wirelessly, connected to the user device and is in a communication path from the user device to the network. In other words, the access point may be directly connected via the direct wired/wireless connection to a network interface card on the user device (e.g., user device Q (100Q), user device R (100R), user device S (100S), user device T (100T)). Further, access points may be directly connected to the network (104) or connected to the network (104) via a controller. By way of an example, the access point may include a wireless access point (WAP) that communicates wirelessly with user devices using Wi-Fi, Bluetooth or related standards and that communicates with a wired network.

Each network device may be connected to any number of user devices at any moment in time. Specifically, each network device may be connected to no user devices, a single user device, or multiple user devices at any particular moment in time. Further, the number of user devices connected to a network device may be heterogeneous amongst network devices.

In one or more embodiments, a network device includes functionality to make a decision whether a user device may communicate with another user device in the system. The network device making the decision may be the network device associated with the source of the message and/or the network device associated with the target of the message. In one or more embodiments, the network device determines whether to block particular messages at the network layer of processing. In other words, the network device may make the determination on a per packet basis in accordance with one or more embodiments. Determining whether to allow or deny a communication is discussed below and in FIG. 4.

Continuing with FIG. 1, the network devices (e.g., network device X (102X), network device Y (102Y)) may be operatively connected, continuously or intermittently, directly or via the network, to a policy manager (106). The policy manager (106) may correspond to a computing system or execute on a computing system and cause the computing system to manage user device records (e.g., user device Q record (110Q), user device T record (110T)) and user role records (e.g., user role M record (112M), user role N record (112N)). In particular, the policy manager (106) may include a user interface to allow an administrator to create, configure, modify, and delete user device records and user role records. The policy manager may further include functionality to update the user device records and user role records accordingly. Maintaining user device records and user role records is discussed below and in FIGS. 2 and 3.

Continuing with FIG. 1, the policy manager computing system may be one or more mobile user devices (e.g., laptop computer, smart phone, personal digital assistant, tablet computer, or other mobile user device), desktop computers, servers, blades in a server chassis, or any other type of computing user device or user devices that includes at least the minimum processing power, memory, and input and output device(s) to perform one or more embodiments. For example, the computing system may include one or more computer processor(s), associated memory (e.g., random access memory (RAM), cache memory, flash memory, etc.), one or more storage user device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. The computing system may also include one or more input device(s), such as a touchscreen, keyboard, mouse, microphone, touchpad, electronic pen, or any other type of input device. Further, the computing system may include one or more output device(s), such as a screen (e.g., a liquid crystal display (LCD), a plasma display, touchscreen, cathode ray tube (CRT) monitor, projector, or other display user device), a printer, external storage, or any other output device. One or more of the output device(s) may be the same or different from the input device(s). The computing system may be connected to a network (104) (e.g., a local area network (LAN), a wide area network (WAN) such as the Internet, mobile network, or any other type of network) via a network interface connection (not shown). The input and output device(s) may be locally or remotely (e.g., via the network) connected to the computer processor(s), memory, and storage user device(s). Many different types of computing systems exist, and the aforementioned input and output device(s) may take other forms. Further, one or more elements of the aforementioned computing system may be located at a remote location and connected to the other elements over a network.

Continuing with FIG. 1, the policy manager (106) is connected to a data repository (108). In one or more embodiments, the data repository (108) is any type of storage unit and/or user device (e.g., a file system, database, collection of tables, or any other storage mechanism) for storing data. Further, the data repository (108) may include multiple different storage units and/or user devices. The multiple different storage units and/or user devices may or may not be of the same type or located at the same physical site. Further, the data repository may be or may execute on the same computing system as policy manager (106). Alternatively or additionally, the data repository (108) may be on a separate computing system.

The data repository (108) includes functionality to store user device records (e.g., user device Q record (110Q), user device T record (110T)) for each user device connected to a network device (e.g., network device X (102X), network device Y (102Y)) in the system. A user device record (e.g., user device Q record (110Q), user device T record (110T)) is information about a user device. Any mechanism may be used to store a user device record without departing from the scope of the claims. In particular, a user device record may be a file, a database record, an entry or row in a table, or another data structure.

FIG. 1 shows an example of a user device record (i.e., user device Q record). As shown in FIG. 1, the user device Q record (110Q) may include, for example, a user device address (114) and a user identifier (115) in accordance with one or more embodiments. A user device address (114) is a unique identifier for a user device. For example, the user device address may be a media access control (MAC) address, a serial number of the user device, an internet protocol address, or another unique identifier of the user device.

A user identifier (115) is a unique identifier of a user that owns or otherwise controls the device. The user identifier may be a single piece of identification (e.g., tax identifier, login name, email address, a system assigned unique identifier) or combination of identifiers (e.g., combination of mailing address and name, combination of name and birthdate, or other combination).

In one or more embodiments, the data repository further includes functionality to store user records (e.g., user W record (111W), user V record (111V)). Each user record maintains a user profile. In one or more embodiments, the user profile corresponds to information about a user of one or more user devices. FIG. 1 shows an example user record (i.e., user W record (111W)). As shown in the example, the user record may include a user identifier (118) and a user role identifier (120). The user identifier (118) is a cross reference to user identifier (115) in the device record. Thus, the user identifier may be the same or similar to the user identifier discussed above.

In one or more embodiments, a user role identifier (120) is an identifier of the user role of the user. A user role is a logical classification of a user that defines the part the user plays within a group or within a particular activity. For example, the user role may be the employment position of the user, the department in which the user works, a project on which the user is working, an organization to which the user belongs, or other classification of the user. The term "user role" as used in this application excludes media access control addresses and internet protocol addresses of the user devices.

Although FIG. 1 shows a user record as including only one user role identifier, the user record may include multiple user role identifiers for when a user has multiple user roles. The data repository may further store information defining a hierarchy of user roles. The hierarchy defines a precedence arrangement of user roles in decisions regarding whether a communication is allowed. Thus, user roles may be accessed according to the hierarchy to determine whether a particular communication is allowed. If the user role is silent, then the next user role is accessed in accordance with one or more embodiments.

The data repository (108) further includes functionality to store user role records (e.g., user role M record (112M), user role N record (112N)) for each defined user role in the system. FIG. 1 shows an example of a user role record (i.e., user role N record (112N)). As shown in FIG. 1, user role N record (112N) includes a user role identifier (122) and a set of predefined user role relationships (124). The user role identifier (122) is a cross reference to user role identifier (120) in user device record.

The set of predefined user role relationships (124) defines whether communication is allowed between user devices of users having the particular user roles. The predefined user role relationships are predefined in that the user role relationships are defined prior to the message that is to be allowed or denied is sent. In some embodiments, the predefined user role relationships for a particular user role may be maintained as a set of user roles to which the particular user role is allowed to communicate, as a set of user roles to which the particular user role is denied communication, or a combination thereof. Further, although not shown, a set of one or more default user role relationships may be defined that specify a default action when a user role relationship is not defined.

In one or more embodiments, the set of user role relationships may include separate user role relationships for different stages of communication. A stage of communication refers to the temporal position of communication within the overall communication session. For example, a user role relationship may exist for when a first particular user role is initiating communication with a second particular user role, another user role relationship may exist for when the first particular user role is responding to a communication from the second particular user role, and a third user role relationship may exist for when the first particular user role has already established communication with the second particular user role.

In one or more embodiments, the set of user role relationships may include separate user role relationships for different types of communication. A type of communication may refer to the data being transmitted in the communication. For example, separate user role relationships may exist for voice data, video data, background data, and best effort data.

In one or more embodiments, individual user role relationships may be defined for collection of user roles. For example, one user role relationship may be defined for when the user(s) corresponding to the source and/or destination has a first collection of user roles while another user role relationship may be defined for when the user(s) corresponding to the source and/or destination has a second collection of user roles. In the example, the first and second collection may or may not overlap in user roles.

Different techniques for storing user role relationships may be used. For example, user role relationships may be stored as access control lists, in a set of one or more tables, or using any other storage mechanism for storing permissions. Further, FIG. 1 show only one possible storage structure for storing records in the data repository. Other storage structures may be used without departing from the scope of the claims.

Although not shown in FIG. 1, software instructions in the form of computer readable program code to perform embodiments may be stored, in whole or in part, temporarily or permanently, on a non-transitory computer readable medium, such as a CD, DVD, storage user device, a diskette, a tape, flash memory, physical memory, or any other computer readable storage medium. Specifically, the software instructions may correspond to computer readable program code that when executed by a processor(s), is configured to perform embodiments. The aforementioned software instructions may be or may implement all or a part of the network device (e.g., network device X (102X), network device Y (102Y)), the policy manager (106), the data repository (108), and/or another component.

While FIG. 1 shows a configuration of components, other configurations may be used without departing from the scope of the claims. For example, various components may be combined to create a single component. As another example, the functionality performed by a single component may be performed by two or more components.

Figure 2:
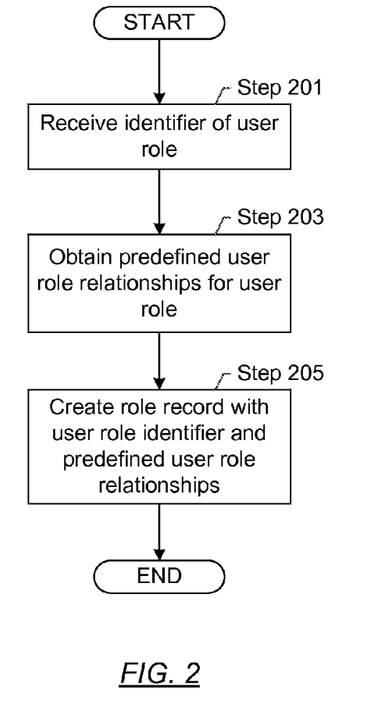
FIGS. 2-4 show flowcharts in accordance with one or more embodiments.
Figure 3:
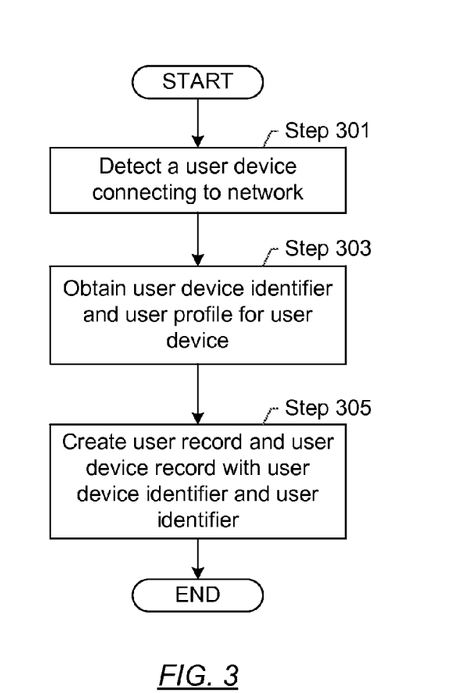

FIGS. 2 and 3 show flowcharts in accordance with one or more embodiments. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt-driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments.

FIG. 2 shows a flowchart for defining user role relationships in accordance with one or more embodiments. In one or more embodiments, a user interface may guide a system administrator in defining the user role relationships. In particular, the user interface may present various graphical user interface components that allows the system administrator to select enter or submit various data items. Alternatively or additionally, the policy manager may receive a file having one or more of the various data items stored therein.

In Step 201, an identifier of a user role is received in one or more embodiments. In one or more embodiments, the user role identifier may be obtained from the user interface or extracted from a file. Further, the user role identifier may be for a previously defined user role or a new user role. For example, a system administrator may submit a new user role identifier for a new user role, select from an existing set of user roles, or otherwise submit the user role identifier.

In Step 203, user role relationships are obtained for the user role in one or more embodiments. In one or more embodiments, for each user role relationship, the policy manager may present the administrator with a set of options for defining the user role relationship. For example, the set of options may include options for specifying the source and/or destination user role, or collection of user roles, specifying the stage of communication to which the user role relationship applies, specifying the type of communication to which the user role relationship application, specifying a position in the hierarchy of user roles, and/or other options. Alternatively or additionally, the administrator may submit the user role relationships in free-form, using a template, via a file, or using another technique. In such a scenario, the obtaining of the user role relationships may be extracted from the file or the user interface depending on the technique for submission.

In Step 205, a user role record is created with the user role identifier and predefined user role relationships. In one or more embodiments, the user role record is stored in the data repository. At this stage, the user role record may be distributed to one or more network devices for enforcement. Alternatively or additionally, the user role record may only be distributed upon demand. Alternatively or additionally, such as when the policy manager or another component is performing the enforcement, the user role record may be maintained in the data repository and access directly from the data repository.

FIG. 3 shows a flowchart for adding a user device to the network in accordance with one or more embodiments. In Step 301, a user device connecting to the network is detected in accordance with one or more embodiments. In one or more embodiments, the user device establishes a direct connection to an access point. As part of establishing the connection, the access point may determine, such as based on the MAC address of the user device, that the user device is a new user device. A new user device may be a user device that does not have a user device record stored in the data repository. In one or more embodiments, determining that the user device is a new user device may include the access point or another network device checking a data repository located on the access point for the user device, and, if not found, sending a request to the policy manager to determine whether any user device record exists for the user device. If no user device record exists, then the user device may be deemed a new user device. Step 301 may be omitted, for example, if a user device record is manually created for the user device prior to a first access by the user device to any access point.

In Step 303, a user device identifier and a user profile are obtained for the user device. In one or more embodiments, the user device identifier may be submitted by a user using a user interface, such as a user interface of the policy manager or access point. Alternatively, the user device identifier may be obtained from the user device. In one or more embodiments, the user profile may be obtained from a user using a user interface. For example, if the user is associated with another existing user device, the user profile may already be in the data repository and an identifier of the user profile is obtained. In the example, the identifier of the user profile may be obtained from the user in one or more embodiments. By way of another example, if the user is not associated with another user device, the user may register with the system. Registration may include the user providing administrative information (e.g., name, address, user identifier, user role(s)), and any other information. Alternatively, an administrator or other individual may submit all or part of the administrative information for the user. The user and/or other individual may submit the user profile using the user device or another user device connected to the system.

In Step 305, a user record and user device record are created with the user device identifier and the user identifier in accordance with one or more embodiments. In one or more embodiments, an existing user device record may be modified or a new user device record may be created with the user device identifier and user identifier. Further, if a user record does not exist, the user record may be created with the user profile in accordance with one or more embodiments. The user device record and user record may be stored and, optionally distributed. For example, the storage may be performed by the access point and transmitted to the data repository. In one or more embodiments, the storage may be performed by the policy manager.

Figure 4:
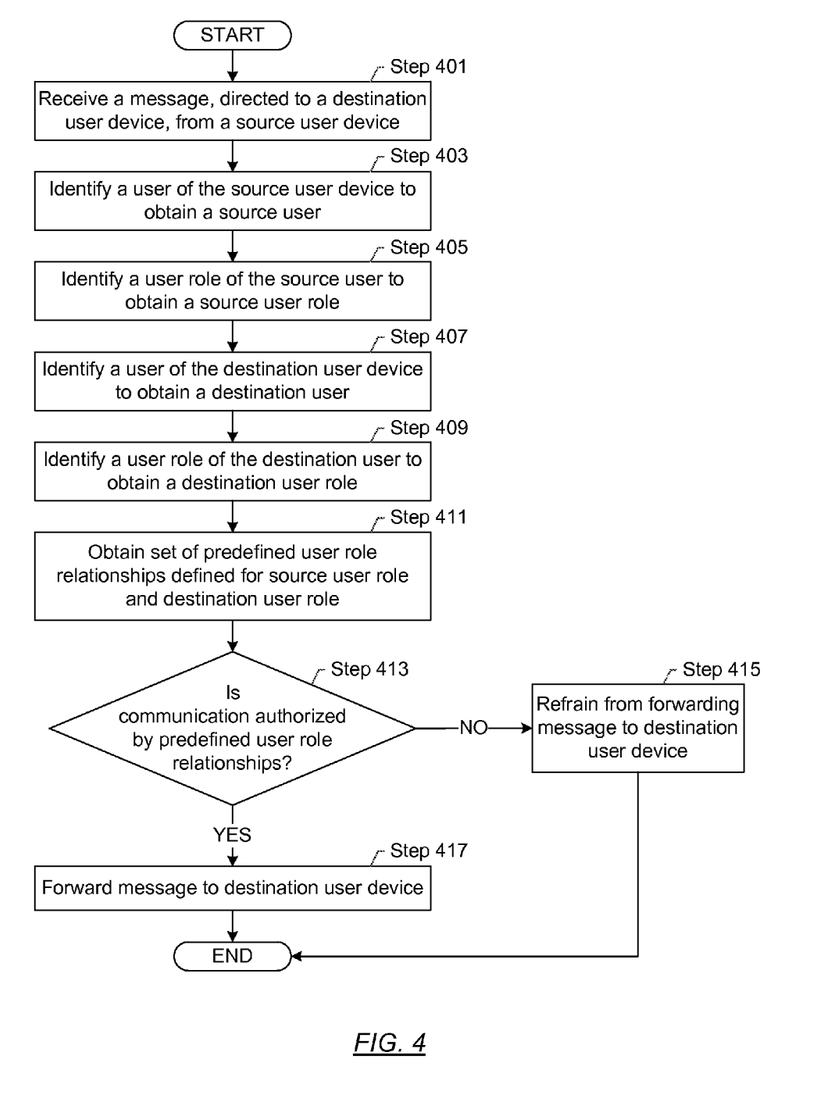

FIG. 4 shows a flowchart for enforcing user role relationships in accordance with one or more embodiments. In Step 401, a message, directed to a destination user device, is received from a source user device in accordance with one or more embodiments. In one or more embodiments, a network device receives the message directly or indirectly from the source user device. The message may be transmitted via a private or public network. From the message, the network device extracts an address of the source user device and an address of the destination user device.

In Step 403, the user of the source user device is identified to obtain a source user role in accordance with one or more embodiments. In one or more embodiments, the network device obtains a user device record for the device having the address of the source user device. The network device may obtain the device record from a local data repository or from a remote data repository. From the device record, the network device may obtain the source user identifier.

In Step 405, a user role of the source user is identified to obtain a source user role in accordance with one or more embodiments. Specifically, from the user record for the source user identifier, the network device extracts the user role or collection of user roles.

In Step 407, the user of the destination user device is identified to obtain a destination user role in accordance with one or more embodiments. In one or more embodiments, the network device obtains a user device record for the device having the address of the destination user device. The network device may obtain the device record from a local data repository or from a remote data repository. From the device record, the network device may obtain the destination user identifier.

In Step 409, a user role of the destination user is identified to obtain a destination user role in accordance with one or more embodiments. Specifically, from the user record for the destination user identifier, the network device extracts the user role or collection of user roles.

In Step 411, a set of predefined user role relationships defined for the source user role and the destination user role are obtained. In one or more embodiments, the network device accesses the local data repository or a remote data repository to obtain user role records corresponding to the user roles. In one or more embodiments, only the relevant user role relationships are obtained. Specifically, the relevant predefined user role relationships are the predefined user role relationships that apply to the type and stage of communication and apply to the source user role or collection thereof and the destination user role or collection thereof.

In Step 413, a determination is made whether communication is authorized by the predefined user role relationships. In one or more embodiments, the network device iterates through the user role relationships according to the hierarchy. If the predefined user role relationship is silent with respect to the communication, the network device may access the next predefined user role relationship in the hierarchy. Otherwise, the network device allows or denies the communication according to the predefined user role relationship.

In Step 415, if communication is not authorized by the predefined user role relationship, then the network device refrains from forwarding the message to the destination device. For example, the network device may drop the message, forward the message to separate storage for later review, or perform another action. Further, the network device may maintain and/or publish in a report and/or alert tracking information about the unauthorized message.

In Step 417, if the communication is authorized by the predefined user role relationships, then the message is forwarded to the destination user device in accordance with one or more embodiments. Specifically, the network device transmits the message directly or indirectly to the destination user device.

Figure 5:
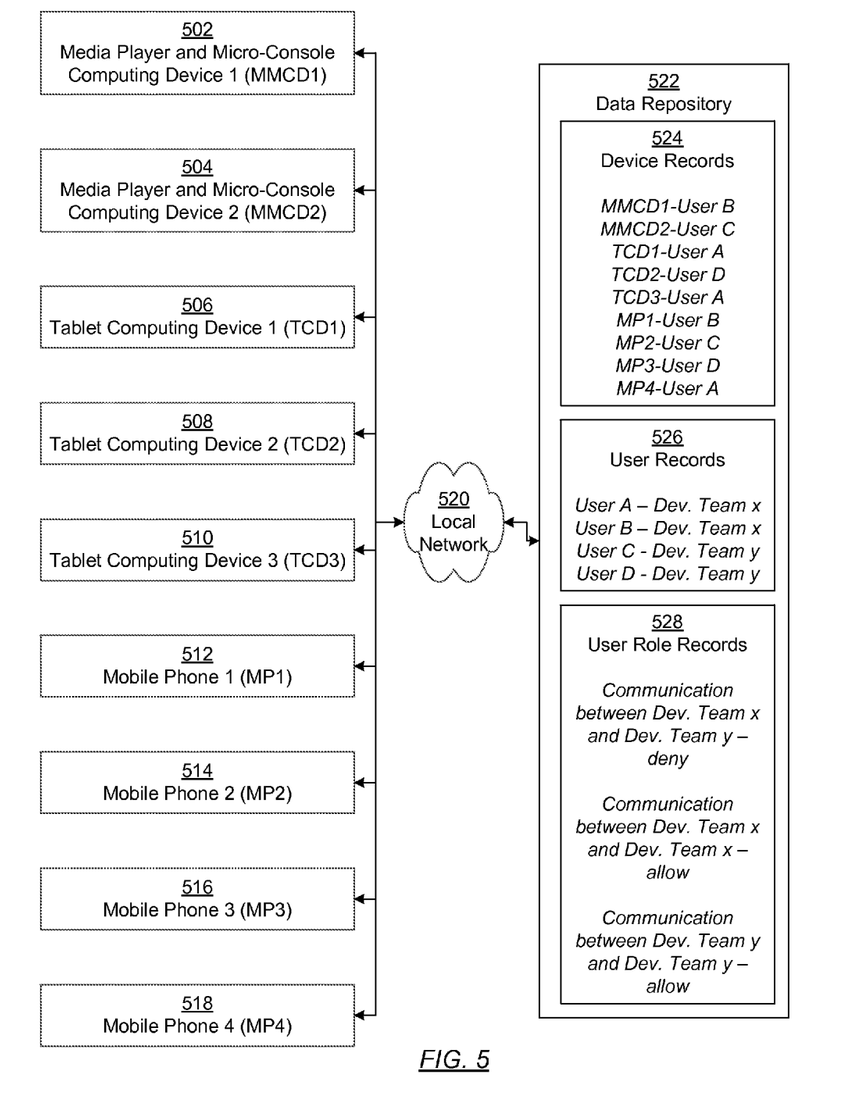
FIG. 5 shows an example in accordance with one or more embodiments.

FIG. 5 shows an example in accordance with one or more embodiments. The following example is for explanatory purposes only and not intended to limit the scope. For the following example, consider the scenario in which a virtual local area network includes digital media player and micro-console devices (e.g., MMCD1 (502), MMCD2 (504)), tablet computing devices (e.g., TCD1 (506), TCD2 (508), TCD3 (510)), and mobile phones (e.g., MP1 (512), MP2 (514), MP3 (516), and MP4 (518)). The various user devices are connected to the same local network (520), which includes various access points (not shown). The example digital media player and micro-console devices, tablet computing devices, and mobile phones may use the multicast-domain name system (mDNS) protocol to advertise the services that the respective devices offer to other devices and to query other devices for available services.

The example system also includes a data repository (522). The data repository (522) stores user device records (524) that associate an identifier of the user device with a user identifier, user records (526) that associate a user identifier with an identifier of a user role, and user device records (528) that define whether various user roles may communicate. In the example, four users exist (e.g., user A, user B, user C, and user D). The four users each belong to one of two development teams (e.g., dev. team x, dev. team y). Devices for users belonging to the same development team may communicate, while devices for users belonging to different development teams may not communicate.

In the example, consider the scenario in which TCD 3 (510) is querying for a service that is provided by MMCD 1 (502) and MMCD2 (504). An access point intercepts the mDNS message requesting the service and determines whether to allow the communication. The access point determines that TCD 3 belongs to user A, who is in the user role of dev. team x, from the records in the data repository (522). Further, the access points determines that MMCD 1 belongs to user B, who is in the user role of dev. team x, and that MMCD 2 belongs to user C, who is in the user role of dev. team y. Based on the user role records and the predefined user role relationships, the access point allows and forwards the message from TCD 3 to MMCD 1 and refrains from forwarding the message from TCD 3 to MMCD 2. Thus, as shown, the user role provides a logical technique for authorizing communication between user devices.

While the invention has been described with respect to a limited number of embodiments, those skilled in the art, having benefit of this disclosure, will appreciate that other embodiments can be devised which do not depart from the scope as disclosed herein. Accordingly, the scope should be limited only by the attached claims.

What is claimed is:

1. A non-transitory computer readable medium comprising instructions which, when executed by one or more hardware processors, causes performance of operations comprising:
   receiving, by a network device during a particular stage of communication, a first message from a first user device addressed to a second user device, wherein the particular stage of communication between the first user device and the second user device is at least one of: initiating a communication, responding to a communication, and after an establishment of a communication;
   determining a set of user roles and a corresponding user role relationship associated with the first device and the second device for the particular stage of communication between the first user device and the second user device;
   identifying the user role relationship between a first user role associated with the first user device and a second user role associated with the second user device, wherein the user role relationship is based on the particular stage of communication corresponding to a temporal position of communication within a communication session between the first user device and the second user device;
   determining if the user role relationship authorizes a communication between the first user device having the first user role and the second user device having the second user role;
   responsive to determining that the user role relationship authorizes the communication between the first user device and the second user device, forwarding the first message from the first user device to the second user device when the particular stage of communication includes an initiation of communication by the second user device; and
   refraining from forwarding the first message from the first user device to the second user device when the particular stage of communication includes an initiation of communication by the first user device.

2. The non-transitory computer readable medium of claim wherein the operations further comprise:
   receiving, by the network device from the first user device, a second message addressed to a third user device;
   identifying the first user role associated with the first user device and a third user role associated with the third user device;
   determining whether the set of user role relationships authorizes a communication between user devices having the first user role and user devices having the third user role;
   responsive to determining that the user role relationships authorizes the communication between user devices having the first user role and user devices having the third user role, forwarding the second message from the first user device to the third user device.

3. The non-transitory computer readable medium of claim 1, wherein first user role and the second user role are a same user role.

4. The non-transitory computer readable medium of claim 1, wherein the first user role and the second user role are different user roles.

5. The non-transitory computer readable medium of claim 1, wherein the set of user role relationships are defined by a system administrator.

6. The non-transitory computer readable medium of claim 1, wherein the first user role is defined by a system administrator.

7. The non-transitory computer readable medium of claim 1, wherein the first user device and the second user device are on different Internet Protocol (IP) subnets.

8. The non-transitory computer readable medium of claim 1, wherein the first user device and the second user device are on a same Internet Protocol (IP) subnet.

9. The non-transitory computer readable medium of claim 1, wherein first user device is associated with the first user role and a third user role.

10. The non-transitory computer readable medium of claim 9, wherein the first user role and the third user role have a hierarchical relationship, wherein the first user role has precedence over the third user role, and wherein the first user role is selected for determining authorization for communication based on the precedence of the first user role.

11. The non-transitory computer readable medium of claim 1, wherein the first user device is associated with a particular plurality of user roles, and the user role relationships indicate whether user devices with the particular plurality of user roles are authorized for communicating with user devices with the second user role.

12. A system comprising:
   at least one network device including a hardware processor; the system being configured to perform operations comprising:
      receiving, by a network device during a particular stage of communication, a first message from a first user device addressed to a second user device, wherein the particular stage of communication between the first user device and the second user device is at least one of: initiating a communication, responding to a communication, and after an establishment of a communication;
      determining a set of user roles and corresponding user role relationship associated with the first device and the second device for the particular stage of communication between the first user device and the second user device;
      identifying the user role relationship between a first user role associated with the first user device and a second user role associated with the second user device, wherein the user role relationship is based on the particular stage of communication corresponding to a temporal position of communication within a communication session between the first user device and the second user device;
      determining if the user role relationship authorizes a communication between the first user device having the first user role and the second user device having the second user role;
      responsive to determining that the user role relationship authorizes the communication between the first user device and the second user device, forwarding the first message from the first user device to the second user device when the particular stage of communication includes an initiation of communication by the second user device; and refraining from forwarding the first message from the first user device to the second user device when the particular stage of communication includes an initiation of communication by the first user device.

13. The system of claim 12, wherein the operations further comprise;

receiving, by the network device from the first user device, a second message addressed to a third user device;

identifying the first user role associated with the first user device and a third user role associated with the third user device;

determining whether the set of user role relationships authorizes a communication between user devices having the first user role and user devices having the third user role;

responsive to determining that the user role relationships authorizes the communication between user devices having the first user role and user devices having the third user role, forwarding the second message from the first user device to the third user device.

14. The system of claim 12, wherein first user device and the second user device are on different Internet Protocol (IP) subnets.

15. The system of claim 12, wherein the first user device and the second user device are on a same Internet Protocol (IP) subnet.

* * * * *